United States Patent Office.

ALFRED LOTTERMOSER, OF DRESDEN, GERMANY, ASSIGNOR TO THE CHEM-ISCHE FABRIK VON HEYDEN, GESELLSCHAFT MIT BESCHRÄNKTER HAF-TUNG, OF RADEBEUL, GERMANY.

PRODUCT OF MERCURY SOLUBLE IN WATER AND METHOD OF MANUFACTURING SAME.

SPECIFICATION forming part of Letters Patent No. 628,270, dated July 4, 1899.

Application filed July 9, 1898. Serial No. 685,477. (No specimens.)

*To all whom it may concern:*

Be it known that I, ALFRED LOTTERMOSER, a subject of the King of Saxony, and a resident of Zelleschestrasse 31, Dresden, Kingdom of Saxony, German Empire, have invented a new and useful Improvement in a Product of Mercury Soluble in Water and Method of Manufacturing the Same, of which the following is a specification.

Various modifications of silver have been brought to public knowledge by M. Carey Lea, (see *American Journal of Sciences*, III Series Vol. XXXVII, page 476 *et seq.*,) of which modifications one soluble in water is of especial importance and has already found employment.

I have discovered that metallic mercury may be converted into a water-soluble modification. This new substance, which may be termed "colloidal mercury," consists of solid black fragments or pieces having a metallic luster and capable of being easily dissolved in water, and thus giving a dark solution, which is only transparent with translucent light, but which is strongly fluorescent with incident light. This new substance serves in medicine and in the arts as a substitute for the insoluble metallic mercury hitherto exclusively employed and may be used advantageously—e. g., for the production of mercurial salve and for the production of mercurial solution for injection instead of the emulsion of insoluble salts of mercury in paraffinum liquidum hitherto used for injection purposes.

The water-soluble mercury is produced by reducing with tin-protoxid salts any of the mercury salts which are soluble in water.

Example: Five hundred and fifty parts, by weight, of nitrate of protoxid of mercury, $Hg_2(NO_3)_2$, is brought into solution of about ten per cent., with an addition of some nitric acid, and this solution allowed to run slowly into a solution of one hundred and thirty to two hundred parts, by weight, of protoxid of tin (SnO) in nitric acid while stirring. To the dark solution which results there is preferably added a concentrated solution of citrate of ammonia until the dissolved colloidal mercury has been precipitated as a black mass. After neutralizing with ammonia the mass is allowed to settle, the liquid decanted off by siphon action, and the muddy residue dried; but before this drying I prefer to wash the said residue. For this washing I prefer to use water into which a suitable quantity of an ammonia salt has been dissolved for the purpose of preventing the water from dissolving too much of the metallic mercury. The longer such washing of the preparation is continued the more completely the tin and the ammonia salt will be removed from it. If the washing out is not continued for a considerable period, a product will be obtained which contains about twenty per cent. of impurities. Instead of salts of ammonia any other neutral alkaline salts may be used, such as the citrate of sodium.

The formation of the colloidal mercury takes place according to the reaction:

$$2HgNO_3 + Sn(NO_3)_2 = 2Hg + Sn(NO_3)_4.$$

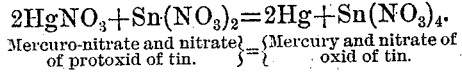
Mercuro-nitrate and nitrate of protoxid of tin. = Mercury and nitrate of oxid of tin.

What I claim as my invention is—

1. The water-soluble colloidal mercury herein described consisting of solid black pieces of metallic luster dissolving in water into a dark solution which is transparent only with translucent light and strongly fluorescent with incident light.

2. The process of obtaining water-soluble metallic mercury from the salts of mercury which are soluble in water, consisting in converting such salts into the soluble metal by treatment with the salts of protoxid of tin, substantially as herein described.

In testimony that I claim the foregoing as my invention I have signed my name, in presence of two witnesses, this 24th day of June, 1898.

ALFRED LOTTERMOSER.

Witnesses:
 HERNANDO DE SOTO,
 PAUL ARRAS.